United States Patent Office

3,218,537
Patented Nov. 16, 1965

3,218,537
MOTOR ACCELERATION AND BRAKING CONTROL SYSTEM WITH STATIC CURRENT SENSING
John J. Stamm, Franklin Township, Westmoreland County, Pa., assignor to Westinghouse Electric Corporation, Pittsburgh, Pa., a corporation of Pennsylvania
Filed Jan. 28, 1963, Ser. No. 254,386
3 Claims. (Cl. 318—274)

This invention relates, generally, to motor control systems and, more particularly, to limit relays for use in motor control systems.

One method of accelerating relatively large electric motors from standstill to full speed when the power supply voltage is fixed is to utilize resistance starting with multiple steps. In order to obtain smooth even acceleration, a limit relay is utilized to control the operation of sequence switches, or a sequence drum, or a cam controller for cutting out resistance from the starting circuit step-by-step. Prior limit relays have been of the electromagnetic type with contact members for opening and closing an energizing circuit for the operating means of the resistor shunting device. On subway cars, street cars and trolley buses, the performance of the limit relays is very important and frequent maintenance is necessary to obtain consistent and trouble-free operation.

An object of this invention is to provide a limit relay of the static type having no moving parts requiring maintenance.

Another object of the invention is to provide for controlling the operation of a resistor shunting device by means of a Zener diode and a magnet valve which function as a unitary device.

A more general object of the invention is to provide a limit relay which shall be simple and efficient in operation and which may be economically manufactured and installed.

Other objects of the invention will be explained fully hereinafter or will be apparent to those skilled in the art.

In accordance with one embodiment of the invention, the operation of a cam controller for shunting resistance from a traction motor circuit during acceleration and dynamic braking is controlled by Zener diodes connected in series-circuit relation with the actuating coils of magnet valves for the air engine which drives the cam controller. One diode and magnet valve coil are connected across a resistor energized by the motor accelerating current to control the operation of the cam controller in one direction during acceleration. Another diode and magnet valve coil are connected across a resistor energized by the dynamic braking current, thereby controlling the operation of the controller in the other direction during dynamic braking. A master controller and a power-brake controller cooperate with the Zener diodes in controlling the magnet valves.

For a better understanding of the nature and objects of the invention, reference may be had to the following detailed description, taken in conjunction with the accompanying drawing, in which.

Figure 1:
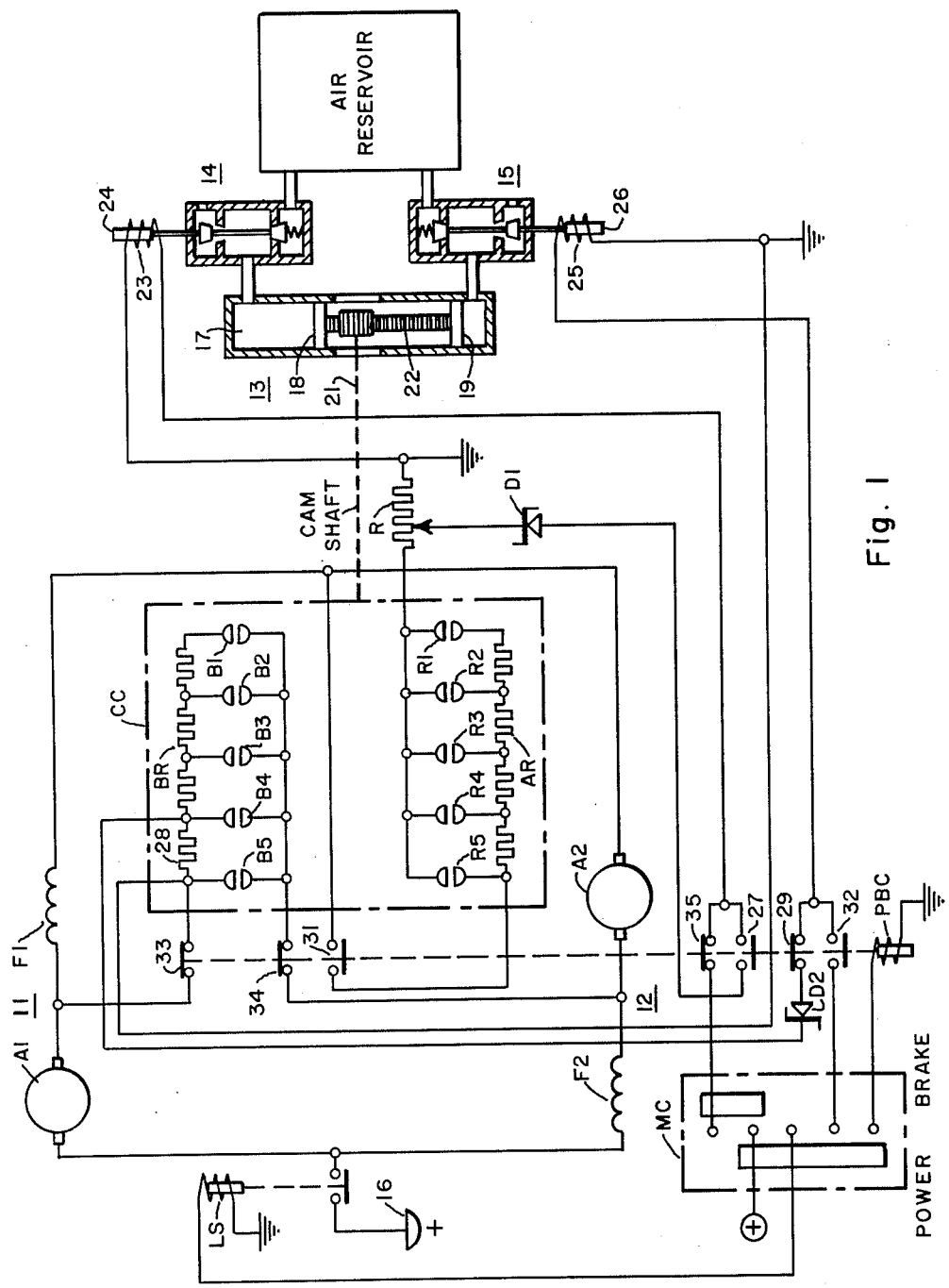
FIGURE 1 is a diagrammatic view of a motor control system embodying the principal features of the invention.

Referring to the drawing, and particularly to FIG. 1, the system shown therein comprises motors 11 and 12, a line switch LS, a master controller MC, a power-brake control switch PBC, an accelerating resistor AR, a braking resistor BR, a cam controller CC, an air engine 13, and magnet valves 14 and 15. The motors 11 and 12 are preferably of the series type suitable for propelling a vehicle, such as a street car or a subway car. The motor 11 has an armature winding A1 and a series field winding F1. The motor 12 has an armature winding A2 and a series field winding F2. It will be understood that reversing switches of the usual type may be provided for reversing the direction of rotation of the motors 11 and 12.

As shown, the motors 11 and 12 are connected in parallel circuit relation. If desired, control apparatus may be provided for first connecting the motors in series circuit relation, and then in parallel circuit relation during the accelerating cycle of operation. Since these connections are well known in the art, they are not shown in the present drawing.

The line switch LS is provided for connecting the motors to a third rail shoe 16 which engages a third rail, or other suitable power conductor (not shown). The power-brake controller PBC is provided for changing the motor connections from power or accelerating connections to dynamic braking connections. The operation of the line switch LS and the controller PBC is controlled by the master controller MC which may be manually or foot operated.

The accelerating resistor AR is provided for controlling the motor current during acceleration of the motors. The braking resistor BR is provided for controlling the motor current during dynamic braking. The accelerating resistor AR is shunted from the motor circuit step-by-step by a plurality of switches R1 to R5 inclusive which are operated by cams of the cam controller CC. Likewise, the braking resistor BR is shunted from the motor circuit by a plurality of switches B1 to B5 which are also operated by cams on the cam controller CC.

The shaft of the controller CC is driven by the air engine 13. The air engine 13 may be of a type well known in the art. The operation of the air engine 13 is controlled by the magnet valves 14 and 15 which control the admission of air to and the discharge of air from a cylinder 17 to operate pistons 18 and 19, thereby driving the cam shaft 21 by means of a rack and pinion 22.

The magnet valve 14 is actuated by electromagnetic means comprising a coil 23 and a core 24. Likewise, the magnet valve 15 is actuated by electromagnetic means comprising a coil 25 and a core 26. The magnet valves 14 and 15 are both of the standard type which admit air to the cylinder 17 from an air reservoir when the coil of the valve is energized and exhaust air from the cylinder 17 when the coil is deenergized.

In order to control the motor current during acceleration, a semiconductor device D1, such as a Zener diode, is provided. Likewise, a Zener diode D2 is provided for controlling the motor current during dynamic braking. The Zener diode D1 is connected to an adjustable reference resistor R which is connected in the motor circuit during acceleration of the motors. The diode D1 and the coil 23 of the magnet valve 14 are connected in series circuit relation across the resistor R through contact members 27 of the controller PBC during acceleration of the motors. Thus, the diode D1 is energized by the voltage drop across the resistor R which, in turn, is proportional to the motor current.

Likewise, the diode D2 is connected in series circuit relation with the coil 25 of the magnet valve 15 across a portion 28 of the resistor BR through contact members 29 of the switch PBC during dynamic braking. Thus, the diode D2 is energized by the voltage drop across the resistor portion 28 which, in turn, is proportional to the motor current during dynamic braking.

Figures 2, 3:
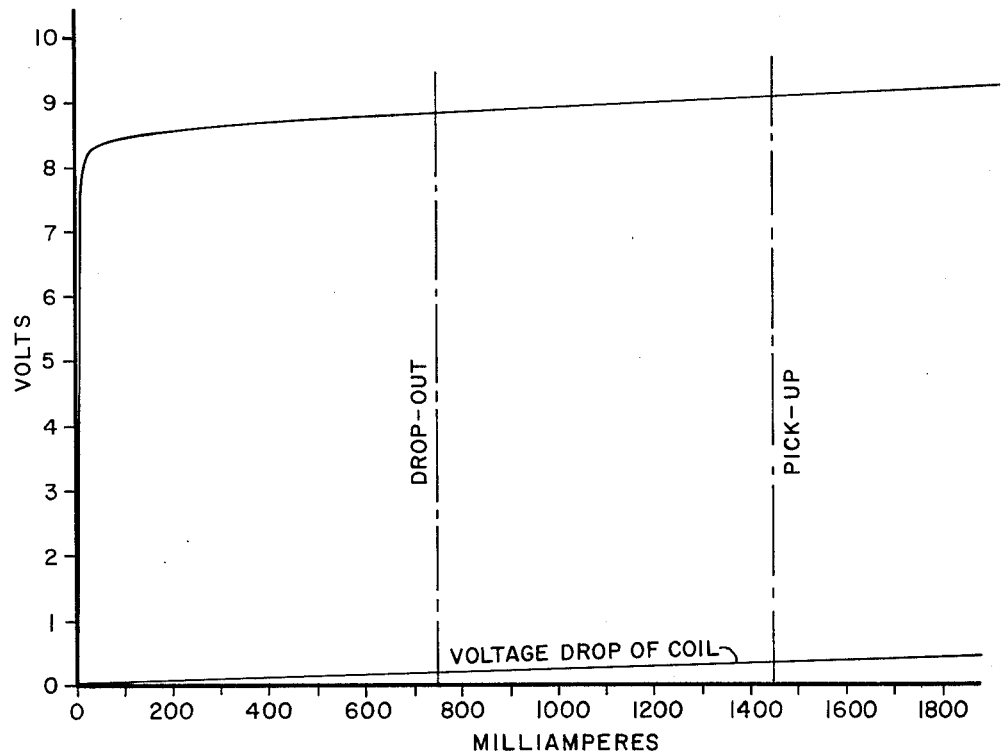
FIG. 2 is a chart showing the sequence of operation of switches illustrated in FIG. 1.
FIG. 3 is a curve showing operating characteristics of a Zener diode and its associated magnet valve coil.

As shown in FIG. 3, the characteristics of a Zener diode are such that it is suitable for the present application. In the forward direction, the diode will start to pass considerable current at a relatively low voltage. In the reverse direction, the diode will conduct only a very small current until the voltage reaches a predetermined value, known as the breakdown voltage. At the breakdown voltage, the current increases extremely rapidly and the device is said to go into the breakdown region. This breakdown is not destructive and the device can be cycled into and out of the breakdown condition indefinitely as long as the device is kept within its thermal limitations.

In view of the flat characteristic of the voltage-current curve for a Zener diode, as shown in FIG. 3, it will be seen that there is only a slight difference in voltage between the pickup and dropout values of current for a magnet valve coil when the flow of current through the coil is controlled by a Zener diode. Thus, the Zener diodes may be connected across resistors in the manner shown to be responsive to the motor current and to control the energization of the magnet valves which, in turn, control the operation of the air engine 13.

It will be understood that the diode D1 could be connected across a portion of the accelerating resistor AR instead of across the resistor R if desired. Likewise, the diode D2 could be connected across a separate reference resistor in the dynamic braking circuit, if desired. Also, a single diode could be utilized to control both magnet valves by providing switching connections for switching the diode from one magnet valve to the other. However, since the diodes are relatively inexpensive, it is more satisfactory to provide two separate diodes.

Assuming that it is desired to accelerate the motors, the master controller MC is actuated to the "power" position. At this time, the coil of the switch LS is energized to close the switch, thereby connecting the motors to the power conductor 16. As previously stated, the motors are operated in parallel circuit relation with the accelerating resistor AR and the resistor R connected in the motor circuit. At this time, the actuating coil of the control switch PBC is also energized to close the contact members 31 of the switch to establish a circuit for connecting the resistor AR and the resistor R in the motor circuit, the contacts 33 and 34 being opened at the same time to interrupt the braking circuit.

The coil 25 of the magnet valve 15 is also energized at this time through contact members 32 of the switch PBC. Thus, air is admitted through the valve 15 to the air engine 13 to raise the piston 19, thereby rotating the cam shaft 21 to close the switch R1 and connect the resistors AR and R in the motor circuit. The current flowing in the resistor R creates a certain voltage drop proportional to the current flow. If the adjustable contact on the resistor is set for a high drop, a relatively small amount of current will generate sufficient IR drop to exceed the breakdown voltage of the Zener diode D1. If this happens, the coil 23 of the magnet valve 14 is also energized to admit air to the upper portion of the cylinder 17 of the air engine 13, thereby stopping the upward movement of the pistons 18 and 19. The rotation of the motors will build up counter electromotive force which, in turn, reduces the motor current. When the current drops to the point at which the IR drop across the resistor R is lower than the breakdown voltage of the Zener diode, current flow to the magnet valve 14 stops and air is permitted to escape from the cylinder 17 causing the cam controller to advance.

The shunting of another step of the resistor AR will cause the motor current to increase sufficiently to reach the point where the IR drop again exceeds the Zener diode voltage, thereby stopping movement of the cam controller. This sequence is repeated until the cam controller is fully advanced step-by-step to shunt the resistor AR from the motor circuit.

When the resistor R is adjusted for a low voltage drop, higher currents are needed to reach the Zener breakdown voltage level. Thus, by adjusting the resistor R, low or high accelerating rates can be obtained.

If dynamic braking is desired, the master controller MC is actuated to the "brake" position, thereby deenergizing the actuating coils of the switches LS and PBC. The opening of the switch LS disconnects the motors from the power source and the closing of the contact members 33 and 34 of the switch PBC establishes dynamic braking connections for the motors. At this time, the motors are so connected that the armature A1 of the motor 11 excites the field winding F2 of the motor 12 and the armature A2 excites the field winding F1. The resistor BR is connected in the circuit which is common to both motors, thereby controlling the dynamic braking current.

As explained hereinbefore, the pistons 18 and 19 of the air engine 13 were raised to their uppermost position during acceleration of the motors. When the controller MC is actuated to the "brake" position, the coil 23 of the magnet valve 14 is energized through contact members 35 of the switch PBC. Thus, air is admitted to the cylinder 17 to drive the pistons 18 and 19 downward. As previously explained, the voltage drop across the portion 28 of the resistor BR is impressed on the Zener diode D2. When the braking current is sufficient to produce a voltage drop across the resistor portion 28 which exceeds the breakdown voltage of the diode D2, the coil 25 of the magnet valve 15 is energized by the current flowing through the Zener diode, thereby admitting air to the lower portion of the cylinder 17 to stop the movement of the pistons 18 and 19. When the dynamic braking current decreases to such a value that the drop across the resistor portion 28 is below the breakdown voltage of the diode D2, the coil 25 is deenergized and air is permitted to exhaust through the magnet valve 15, thereby permitting movement of the cam controller CC to shunt another step of resistance from the motor circuit. This sequence is repeated to shunt the resistor BR from the dynamic braking circuit step-by-step until the cam controller is in the original or off position.

As previously explained, the characteristics of a Zener diode are such that when utilized with electromagnetic devices constructed to operate on relatively low voltage, the diode and the electromagnetic device constitute a unit which is suitable for controlling the acceleration and the dynamic braking of electric motors. Other semiconductor devices and other electromagnetic devices having similar operating characteristics may be utilized. In order to simplify the present drawing and description, the usual protective devices and protective interlocking provided in control systems of the present type have been omitted.

From the foregoing description, it is apparent that the invention provides a static device for controlling the energization of the control means for controlling motor current during acceleration and dynamic braking of the motor. Since the static device has no moving parts, maintenance and adjustment of the device are reduced. Furthermore, the semiconductor device is relatively inexpensive.

Since numerous changes may be made in the above-described construction, and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In a control system, in combination, a motor, a power conductor, switching means for connecting the motor to the power conductor to accelerate the motor, additional switching means for establishing dynamic braking connections for the motor, variable resistance means for controlling the motor current during acceleration and braking, control means for varying said resistance means, electromagnetic means for controlling the operation of said control means, a Zener diode responsive to the motor current during acceleration, another Zener diode responsive to the motor current during dynamic braking, and said Zener diodes controlling the energization of said electromagnetic means.

2. In a control system for an electric motor, means for connecting the motor to a power source to accelerate the motor, means for establishing connections for dynamic braking of the motor, resistance means for controlling the motor current, control means for progressively varying said resistance means during acceleration and braking, first semiconductor means responsive to the motor current during acceleration, and second semiconductor means responsive to the motor current during braking, said first and second semiconductor means being connected to effect interruption of the operation of said control means when the respective motor currents exceed predetermined values.

3. In a control system for an electric motor, means for connecting the motor to a power source to accelerate the motor, means for establishing connections for dynamic braking of the motor, an accelerating resistor connected to control the motor current during acceleration, a braking resistor connected to control the motor current during braking, control means for progressively shunting said resistor in steps during acceleration and during braking, first semiconductor means responsive to motor current during acceleration for effecting interruption of the operation of said control means when the motor current exceeds a first predetermined value, and second semiconductor means responsive to motor current during braking for effecting interruption of the operation of said control means when the motor current exceeds a second predetermined value.

References Cited by the Examiner
UNITED STATES PATENTS

| | | | |
|---|---|---|---|
| 2,663,835 | 12/1953 | Willby | 318—274 X |
| 2,769,131 | 10/1956 | Immel | 318—421 X |
| 3,067,372 | 12/1962 | Blanchard et al. | 318—422 X |
| 3,068,390 | 12/1962 | Lichtenfels et al. | 318—422 X |

ORIS. L. RADER, *Primary Examiner.*